United States Patent
Otanez et al.

(10) Patent No.: US 8,424,659 B2
(45) Date of Patent: Apr. 23, 2013

(54) VIBRATION ABSORBER

(75) Inventors: Paul G. Otanez, Troy, MI (US);
Shushan Bai, Ann Arbor, MI (US);
Vijay A. Neelakantan, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 510 days.

(21) Appl. No.: 12/694,906

(22) Filed: Jan. 27, 2010

(65) Prior Publication Data

US 2011/0180358 A1 Jul. 28, 2011

(51) Int. Cl.
*F16F 15/12* (2006.01)

(52) U.S. Cl.
USPC ........................................................ 188/378

(58) Field of Classification Search ...... 74/574.1–574.4, 74/572.2, 604; 464/180; 188/378–380; 192/201
See application file for complete search history.

(56) References Cited

U.S. PATENT DOCUMENTS

| | | | | | |
|---|---|---|---|---|---|
| 3,296,887 | A | * | 1/1967 | Larsen | 464/68.41 |
| 4,070,922 | A | * | 1/1978 | Wyman | 74/574.3 |
| 4,995,282 | A | * | 2/1991 | Schumacher | 74/574.3 |
| 5,269,197 | A | * | 12/1993 | Yang | 74/570.2 |
| 5,495,924 | A | * | 3/1996 | Shaw et al. | 188/378 |
| 5,666,862 | A | * | 9/1997 | Eckel et al. | 74/574.3 |
| 2009/0211871 | A1 | * | 8/2009 | Hartmann et al. | 192/41 S |

\* cited by examiner

*Primary Examiner* — Robert A Siconolfi
*Assistant Examiner* — Stephen Bowes

(57) ABSTRACT

A system for absorbing vibration in a rotary member having a predetermined rotary speed of the present invention has a selectively moveable mass and a positioning mechanism. The mass is in communication with the rotary member having a predetermined position. The positioning mechanism exerts a force on the mass at least when the rotary member operates below the predetermined rotary speed. The force exerted by the positioning mechanism orients the mass at the predetermined position when the rotary member operates below the predetermined rotary speed.

11 Claims, 8 Drawing Sheets

VIBRATION ABSORBER

FIELD

The present disclosure relates to a system for absorbing vibration in a rotary member, and more particularly to a system including a positioning mechanism that orients a mass in a predetermined position when the rotary member operates below a predetermined rotary speed.

BACKGROUND

The statements in this section merely provide background information related to the present disclosure and may or may not constitute prior art.

Centrifugal Pendulum Vibration Absorbers (CPVAs) are typically used to reduce torsional vibrations in rotating machine components. For example, a rotating member such as a shaft includes several CPVAs arranged symmetrically about a rotational axis of the shaft. Each CPVA has a pendulum mass that is constrained in movement along a specific path relative to the rotational axis of the shaft. Each pendulum mass oscillates or moves back and forth along the path as the shaft operates. The movement of the pendulum masses about the paths counteract torque fluctuations that are created as the shaft operates, which reduces the torsional vibration of the shaft.

When the shaft comes to a rest, the pendulum masses stop moving and tend to settle in different positions in relation to the rotational axis of the shaft. However, allowing the pendulum masses to settle in different positions may increase the time it takes for the pendulum masses to come to a rest, contributes to instability of the shaft, and may also lead to unwanted noise as the shaft begins to rotate again.

Another known problem with CPVAs occurs when the shaft operates at lower rotational speeds. Specifically, movement of the pendulum masses tends to produce unwanted noises, such as rattling, as the shaft operates at a relatively slow speed. All of the issues discussed above can be problematic in automotive applications, especially as the engine starts up and comes to a stop.

While CPVAs achieve their intended purpose, the need for new and improved CPVA configurations which exhibit improved performance, especially from the standpoint of noise, is essentially constant. Accordingly, there is a need for an improved, cost-effective, and quieter CPVA.

SUMMARY

A system for absorbing vibration in a rotary member is provided, having a selectively moveable mass and a positioning mechanism. The rotary member has a predetermined rotary speed. The mass is in communication with the rotary member and has a predetermined position. The positioning mechanism exerts a force on the mass at least when the rotary member operates below the predetermined rotary speed. The force exerted by the positioning mechanism orients the mass at the predetermined position when the rotary member operates below the predetermined rotary speed.

In an embodiment of the present invention, a second selectively moveable mass having a second predetermined position is included. The predetermined position and the second predetermined position are about equal when measured from a rotary axis of the rotary member.

In another embodiment of the present invention, the mass experiences an acceleration force as the rotary member accelerates above the predetermined rotary speed, where the acceleration force urges the mass out of the predetermined position.

In yet another embodiment of the present invention, the force exerted from the positioning mechanism is removed from the mass when the rotary member operates above the predetermined rotary speed.

In an embodiment of the present invention, the positioning mechanism includes a positioning mass and a biasing mechanism that is connected to the rotary member at one end and the positioning mass at another end. The positioning mass experiences a centrifugal force that compresses the biasing mechanism as the rotary member operates above the predetermined rotary speed.

In another embodiment of the present invention, the biasing mechanism is a spring that contacts the mass when the rotary member operates below the predetermined rotary speed.

In yet another embodiment of the present invention, the positioning mechanism further includes a lever and a contacting member. The positioning mass is located at a first end of the lever and the biasing mechanism is located at a second end of the lever, and the contacting member is connected to the lever and selectively contacts the mass and exerts the force as the lever rotates about a fulcrum.

In an embodiment of the present invention, the lever is positioned in the same plane as a rotary axis of the rotary member, and wherein the fulcrum is positioned to be generally perpendicular to the rotary axis.

In another embodiment of the present invention, the mass is substantially roller shaped and the rotary member includes a corresponding recess within the shaft. The mass travels within the recess as the rotary member operates above the predetermined rotary speed.

In an embodiment of the present invention, the mass is connected to the rotary shaft by at least one pivoting member including a first end portion and a second end portion. The pivoting member is connected to the rotary member at a first end portion and connected to the mass at the second end portion.

In another embodiment of the present invention, the mass includes at least one recess and the rotary member includes as least one post. The post is received by the recess of the mass, and the mass travels about the post as the rotary member operates above the predetermined rotary speed.

In another embodiment of the present invention the mass is connected to the shaft by the positioning mechanism.

In yet another embodiment of the invention, a system for absorbing vibration in a rotary member is provided including the rotary member, at least two selectively moveable masses and a positioning mechanism. The rotary member has a predetermined rotary speed. The selectively moveable masses are in communication with the rotary member and each has a predetermined position. The predetermined position of each mass is measured from a rotary axis of the rotary member. Each of the positioning mechanisms correspond to one of the masses. The positioning mechanism exerts a force on the corresponding mass at least when the rotary member operates below the predetermined rotary speed. The force exerted by the positioning mechanism orients the mass at the predetermined position when the rotary member operates below the predetermined rotary speed. The predetermined position for each mass is about equal to one another when the rotary member operates below the predetermined rotary speed.

In another embodiment of the present invention, each positioning mechanism includes a positioning mass and a biasing mechanism that is connected to the rotary member at one end and the positioning mass at another end. The positioning mass experiences a centrifugal force that compresses the biasing mechanism as the rotary member operates above the predetermined rotary speed.

In yet another embodiment of the present invention, the biasing mechanism is a spring, and the positioning mass contacts the mass and exerts the force when the rotary member operates below the predetermined rotary speed.

In an embodiment of the present invention, each mass is connected to the shaft by the positioning mechanism.

In another embodiment of the present invention, each mass is connected to the rotary shaft by at least one pivoting member including a first end portion and a second end portion. The pivoting member is connected to the rotary member at a first end portion and is connected to the corresponding mass at the second end portion.

In yet another embodiment of the invention, a system for absorbing vibration in a rotary member is provided including the rotary member, a selectively moveable masses and a positioning mechanism. The rotary member has a predetermined rotary speed. The selectively moveable mass is connected to the rotary member, and has a predetermined position. The positioning mechanism includes a positioning mass, and the positioning mechanism exerts a force on the mass when the rotary member operates below the predetermined rotary speed. The force is removed from the mass when the rotary member operates above the predetermined rotary speed. The positioning mass experiences a centrifugal force as the rotary member operates above the predetermined rotary speed. The force exerted by the positioning mechanism orients the mass at the predetermined position when the rotary member operates below the predetermined rotary speed, and the positioning mechanism does not contact the mass when the rotating member operates above the predetermined rotary speed.

In an embodiment of the present invention, the positioning mechanism includes a biasing mechanism that is a spring. The centrifugal force experienced by the positioning mass compresses the biasing mechanism as the rotary member operates above the predetermined rotary speed.

In another embodiment of the present invention, each mass is connected to the rotary shaft by at least one pivoting member including a first end portion and a second end portion. The pivoting member is connected to the rotary member at a first end portion and is connected to the corresponding mass at the second end portion.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
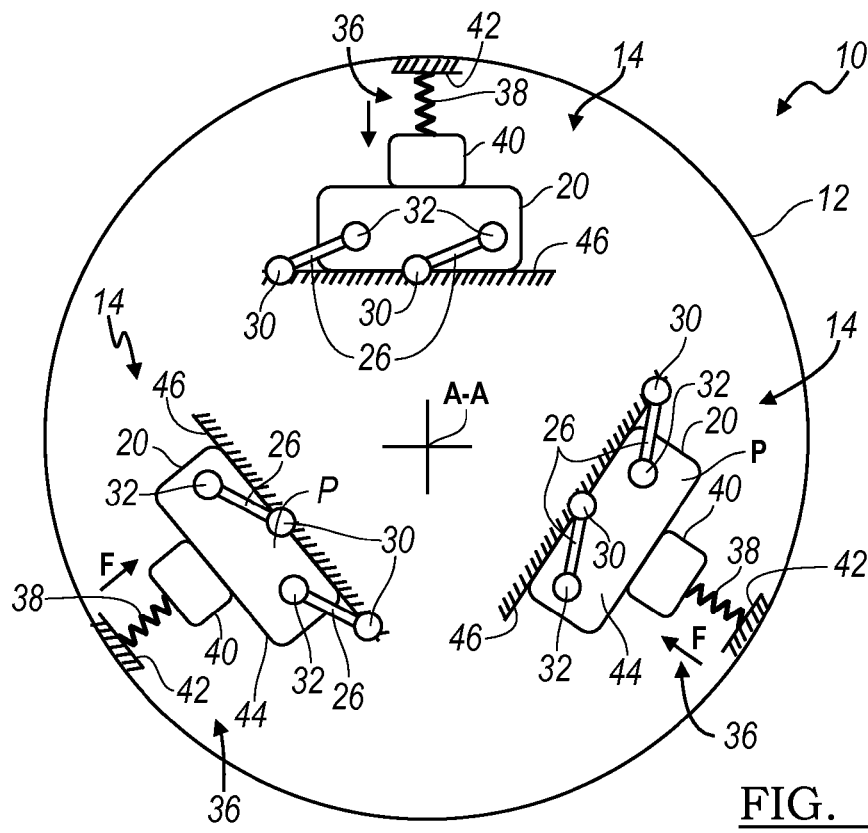
FIG. 1 is an illustration of a vibration absorber system in accordance with an embodiment of the present invention, where the vibration absorber system includes a shaft operating below a predetermined rotary speed.

The following description is merely exemplary in nature and is not intended to limit the present disclosure, application, or uses. With reference to FIG. 1, a vibration absorber system is generally indicated by reference number 10. The vibration absorber system 10 includes a rotating member or shaft 12 and at least one vibration absorber 14. The shaft 12 may be driven by an engine (not shown), or other torque producing machine to provide a driving torque to the shaft 12. The shaft 12 is illustrated in FIG. 1 operating at a predetermined rotary speed, where the predetermined rotary speed occurs as the shaft 12 operates at either a low engine speed or when the shaft 12 is at rest. A low engine speed is defined as the engine speed at idling, which can typically be about 500 RPM.

Each of the vibration absorbers 14 are arranged in a substantially symmetrical pattern around a rotational axis A-A of the shaft 12. In the present embodiment, three vibration absorbers 14 are included with the vibration absorber system 10, however those skilled in the art will appreciate that any number of vibration absorbers may be used. FIG. 1 illustrates the vibration absorbers as centrifugal pendulum vibration absorbers (CPVAs), however other variations of vibration absorbers may be used as well.

Each of the vibration absorbers 14 include a pendulum mass 20. In the embodiment as shown, the mass 20 is block shaped, however those skilled in the art will appreciate that any shape or configuration, such as a spherical or a roller shaped mass, may be used as well. When the shaft 12 operates below the predetermined rotary speed, each of the masses 20 are located in about the same location in relation to the rotational axis A-A of the shaft 12. A predetermined position P is used to indicate the position of the masses 20 as the shaft 12 operates below the predetermined rotary speed.

Each mass 20 is in communication with the shaft 12, where several different approaches exist placing the masses 20 in communication with the shaft 12. For example, in the embodiment as shown the masses 20 are each connected to the shaft 12 by a plurality of connecting members 26. Each of the connecting members 26 include a first end portion 30 and a second end portion 32. The connecting members 26 are connected to the shaft 12 at the first end portion 30 and are connected to the mass 20 at the second end portion 32. Although the present embodiment illustrates two connecting members 26 included with each mass 20, any number of connecting members may be used to connect the masses 20 to the shaft 12. Moreover, one skilled in the art will appreciate that other mechanisms may be used as well to connect the masses 20 to the shaft 12.

Each connecting member 26 is selectively pivotable about the first end portion 30. Specifically, when the shaft 12 operates above the predetermined rotary speed, the connecting member 26 may pivot about the first end portion 30 (illustrated in FIG. 2), allowing the corresponding mass 20 to oscillate in a constrained path. Referring to FIG. 1, as the shaft 12 operates below the predetermined rotary speed, the connecting member 26 does not substantially pivot about the first end portion 30, and the corresponding mass 20 remains relatively stationary in the predetermined position P. Thus, the connecting member 26 selectively moves the mass 20 depending on the rotary speed of the shaft 12.

Each of the centrifugal vibration absorbers 14 also includes a positioning mechanism 36 used to orient the mass 20 in the predetermined position P. In the embodiment as shown, the positioning mechanism 36 is a biasing system including a biasing member 38, a contacting mass 40, and an attachment point 42. The attachment point 42 of the positioning mechanism 36 is used to fixedly attach the positioning mechanism 36 to the shaft 12. The contacting mass 40 represents a portion of the positioning mechanism 36 that selectively makes contact with an outer surface 44 of the corresponding mass 20.

The biasing member 38 exerts a force F on the mass 20 at least when the shaft 12 operates below the predetermined rotary speed. In the embodiment as shown, the biasing member 38 is a spring that exerts the force F inwardly towards the rotational axis A-A of the shaft 12. Although the present embodiment includes a spring used to exert the force F, those skilled in the art will appreciate that any type of device that exerts the force F on the mass 20 may be used as well. For example, the positioning mechanism 36 could include a magnet or a piston.

The force F exerted by the positioning mechanism 36 urges the corresponding mass 20 into the predetermined position P. Specifically, the biasing member 38 is attached to the contacting mass 40, where the contacting mass 40 exerts the force F on the corresponding mass 20 by making contact with the mass 20. In the embodiment as illustrated, each mass 20 is urged inwardly towards the rotational axis A-A such that the mass 20 abuts a surface 46 of the vibration absorber 14.

Figure 2:
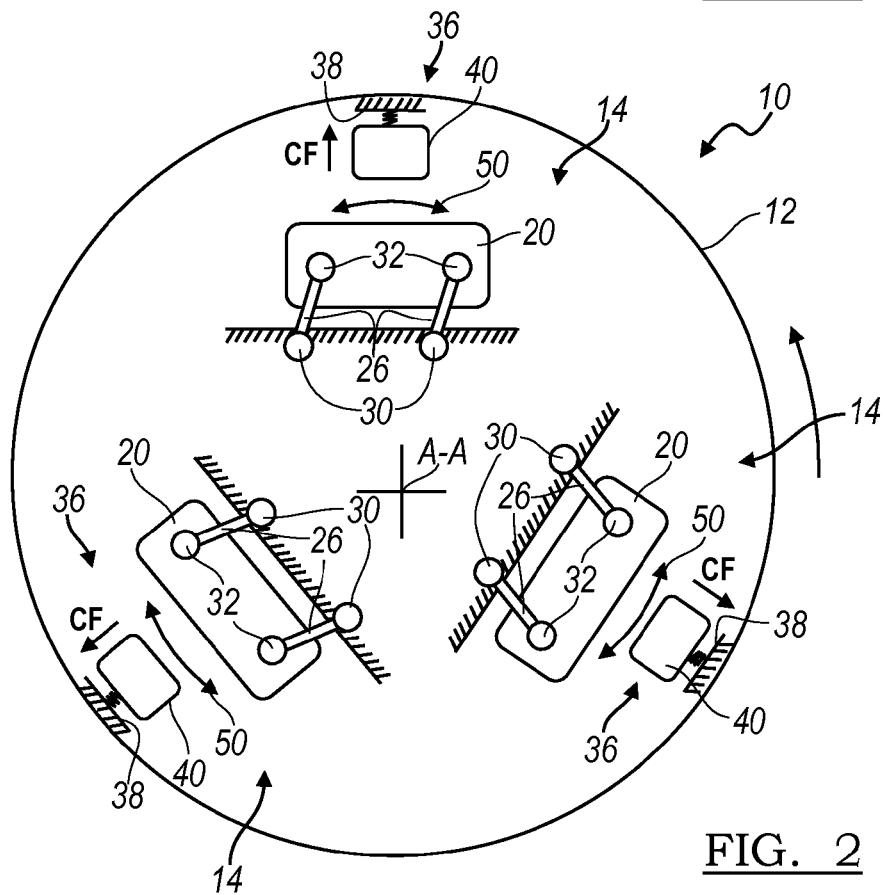
FIG. 2 is an illustration of the vibration absorber system in FIG. 1 where the shaft operates above the predetermined rotary speed.

As the shaft 12 operates above the predetermined rotary speed, each mass 20 may no longer be oriented in the predetermined position P, and instead travels along a specific path relative to the rotational axis A-A of the shaft 12. FIG. 2 illustrates the shaft 12 rotating above the predetermined rotary speed, where each mass 20 has moved out of the predetermined position P, and travels about a path 50.

The biasing member 38 is compressed by a centrifugal force CF experienced by the contacting mass 40. The centrifugal force CF is produced as the shaft 12 operates above the predetermined rotary speed. The centrifugal force CF is exerted in a direction that is generally opposite from and overcomes the force F, urging the biasing member 38 away from the rotational axis A-A and into a compressed state. The positioning mechanism 36 retracts outwardly away from the rotational axis A-A such that the contacting mass 40 is unable to contact the mass 20. Therefore the contacting mass 40 is unable to exert the force F on the mass 20 as the shaft 12 operates above the predetermined rotary speed.

As the shaft 12 operates above the predetermined rotary speed, each mass 20 is urged out of the predetermined position P and is free to travel about the path 50. Specifically, the connecting members 26 can pivot about the first end portion 30, thereby creating the path 50 that the corresponding mass 20 travels about. The movement of the mass 20 along the path 50 is used to counteract at least some of the torque fluctuations that are created as the shaft 12 operates above the predetermined rotary speed, which thereby reduces the torsional vibration of the shaft 12.

Because the positioning mechanism 36 no longer exerts the force F on the mass 20 when the shaft 12 rotates above the predetermined rotary speed, movement of the mass 20 along the path 50 is independent from the force F that is exerted by positioning mechanism 36. This may be desirable in at least some types of applications because some types vibration absorbers, especially CPVAs, tend to have a natural frequency that is directly proportional to the rotary speed of the shaft 12. A natural frequency that is directly proportional to the rotary speed of the shaft 12 attenuates torsional vibrations of the shaft 12 at a broad range of frequencies. However, it is understood that in other embodiments of the present invention the positioning mechanism may exert a force on the mass when the shaft operates above the predetermined rotary speed.

Figure 3:
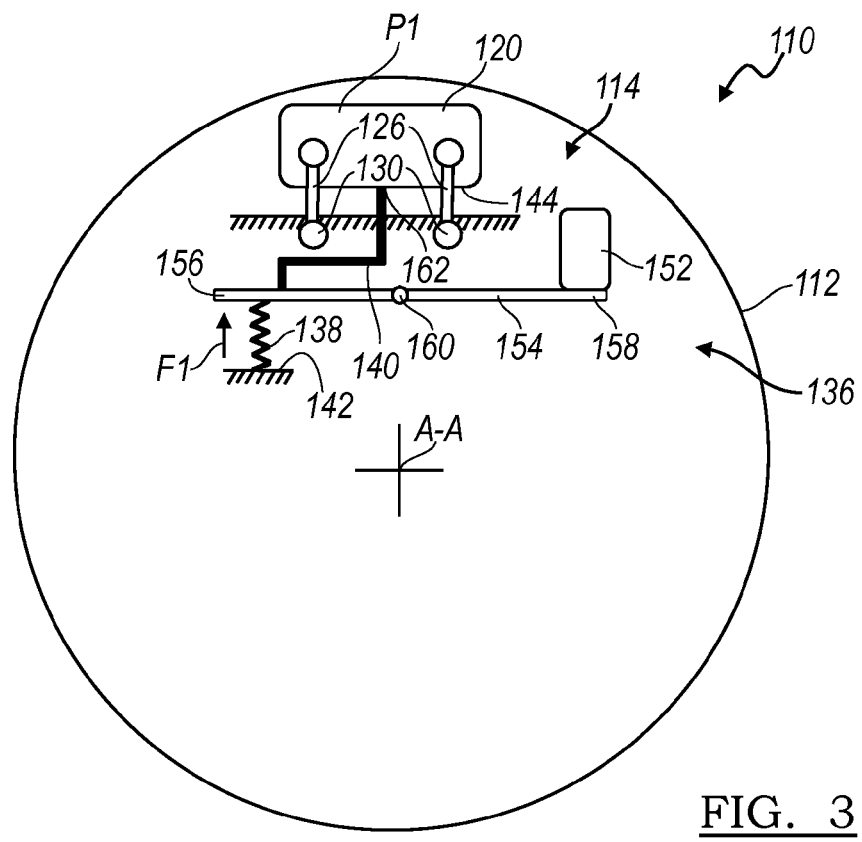
FIG. 3 is an illustration of a vibration absorber system in accordance with an embodiment of the present invention, where the vibration absorber system includes a shaft operating below a predetermined rotary speed.

Referring now to FIG. 3, a vibration absorber according to an embodiment of the present invention is illustrated as reference number 110. The vibration absorber 110 includes a shaft 112 and a vibration absorber 114, where the shaft 112 is illustrated operating below the predetermined rotary speed. The vibration absorber 114 includes a mass 120 that is connected to the shaft 112 by a plurality of connecting members 126. A positioning mechanism 136 exerts a force F1 in a direction outwardly away from the rotational axis A-A of the shaft 120. The force F1 orients the mass 120 in a predetermined position P1 outwardly away from the rotational axis A-A. The connecting members 126 have been pivoted about a first end portion 130 outwardly away from the rotational axis A-A of the shaft 112.

The positioning mechanism 136 includes a biasing member 138, a contacting member 140, a lever 154, an attachment point 142, and a second mass 152. The second mass 152 is attached to a second end portion 158 of the lever 154. When the shaft 112 operates below the predetermined rotary speed, the biasing member 138 exerts the force F1 outwardly away from the rotational axis A-A and on a first end portion 156 of the lever 154. The force F1 is exerted on the mass 120 by the contacting member 140. Specifically, when the lever 154 is stationary about a fulcrum 160, a portion 162 of the contacting member 140 makes contact with a portion of an outer surface 144 of the mass 120. The contacting member 140 exerts the force F1 outwardly away from the rotational axis A-A, thereby orienting the mass 120 in the predetermined position P1.

Figure 4:
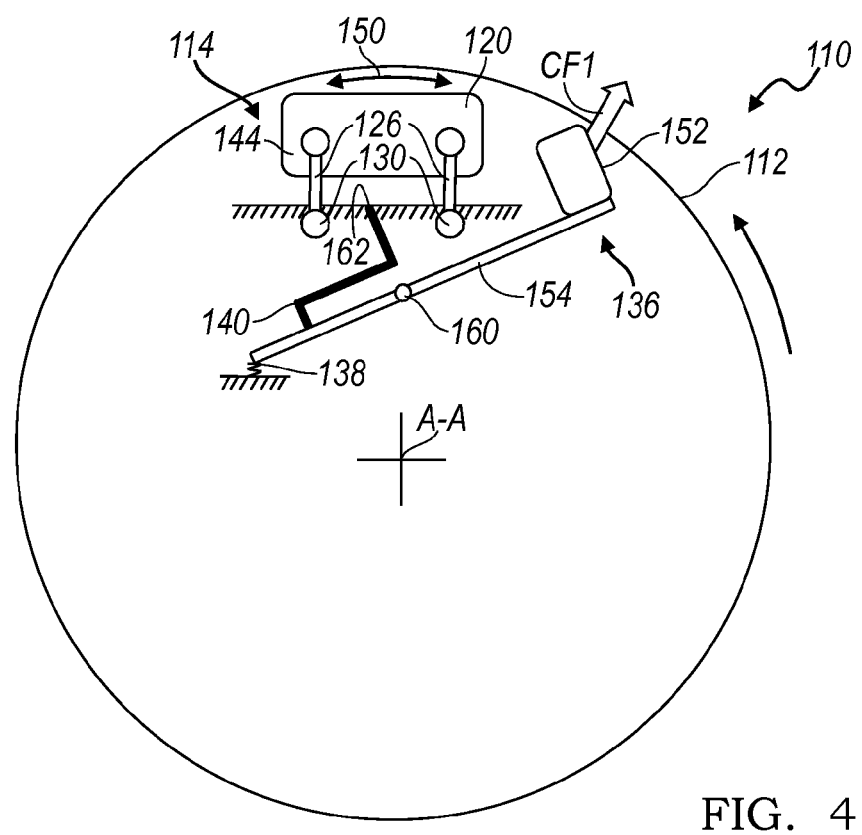
FIG. 4 is an illustration of the vibration absorber system in FIG. 3 where the shaft operates above the predetermined rotary speed.

Referring to FIG. 4, as the shaft 112 operates above the predetermined rotary speed, the biasing member 138 compresses inwardly towards the rotational axis A-A due to a centrifugal force CF1 experienced by the second mass 152. The centrifugal force CF1 is produced as the shaft 112 operates in a rotary motion above the predetermined rotary speed. When the shaft operates above the predetermined rotary speed, the centrifugal force CF1 experienced by the second mass 152 overcomes the force F1. The centrifugal force CF1 urges the biasing member 138 inwardly from the rotational axis A-A and into a compressed state, thereby pivoting the lever 154 about the fulcrum 160.

As the centrifugal force CF1 urges the lever 154 to pivot about the fulcrum 160, the portion 162 of the contacting member 140 is no longer in contact with the outer surface 144 of the mass 120. Therefore, the force F1 is not exerted on the mass 120, and the mass 120 is urged out of the predetermined position P1. The mass 120 is free to travel about a path of movement 150 as the shaft 112 operates above the predetermined rotary speed.

Figure 5A:
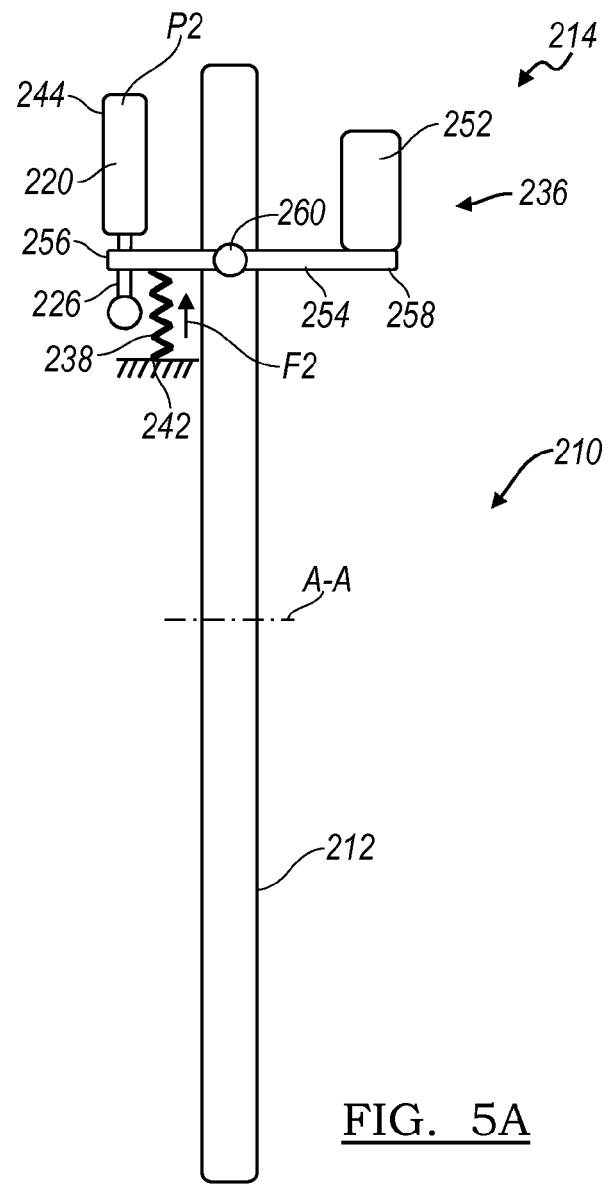
FIG. 5A is a side view of a vibration absorber system in accordance with an embodiment of the present invention, where the vibration absorber system includes a shaft operating below a predetermined rotary speed.
Figure 5B:
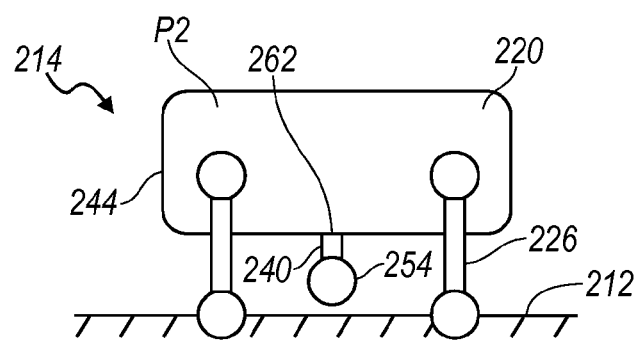
FIG. 5B is a front view of a mass of the vibration absorber system in FIG. 5A.

In yet another embodiment of the invention, a vibration absorber is illustrated in FIG. 5A as reference number 210. The vibration absorber 210 includes a shaft 212 and a vibration absorber 214, where the shaft 212 is illustrated operating below the predetermined rotary speed. Referring to both of FIGS. 5A-5B, a positioning mechanism 236 includes a lever 254, a contacting member 240, a biasing member 238, an attachment point 242, and a second mass 252. The lever 254 is oriented in the same plane as a rotary axis A-A of the shaft 212, and the fulcrum 260 is positioned to be generally perpendicular to the rotary axis A-A. The fulcrum 260 of the lever 254 rotatably connects the lever 254 to the shaft 212, and a portion 262 of the contacting member 240 makes contact with an outer surface 244 of the mass 220. The mass 220 is connected to the shaft 212 by a plurality of connecting members 226.

The second mass 252 is attached to a second end portion 258 of the lever 254. When the shaft 212 operates below the predetermined rotary speed, the biasing member 238 exerts a force F2 outwardly away from the rotational axis A-A and on a first end portion 256 of the lever 254. The contacting member 240 exerts the force F2 outwardly away from the rotational axis A-A, and on the mass 220, orienting the mass 220 in a predetermined position P2.

Figure 6A:
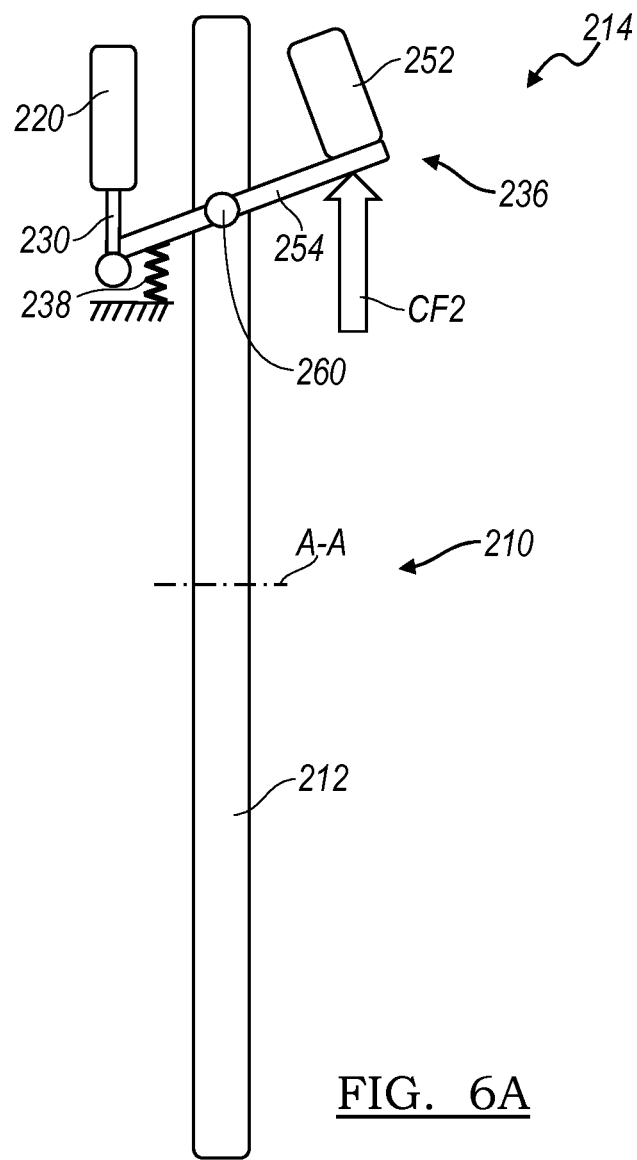
FIG. 6A is a side view illustration of the vibration absorber system in FIG. 5A where the shaft operates above the predetermined rotary speed.

Referring to FIG. 6A, as the shaft 212 operates above the predetermined rotary speed, the biasing member 238 compresses inwardly towards the rotational axis A-A due to a centrifugal force CF2 experienced by the second mass 252. The centrifugal force CF2 is produced as the shaft 212 operates in a rotary motion above the predetermined rotary speed. The centrifugal force CF2 is exerted in a direction that is generally opposite from the force F2, and urges the biasing member 238 inwardly towards the rotational axis A-A and into a compressed state, pivoting the lever 254 about the fulcrum 260.

Figure 6B:
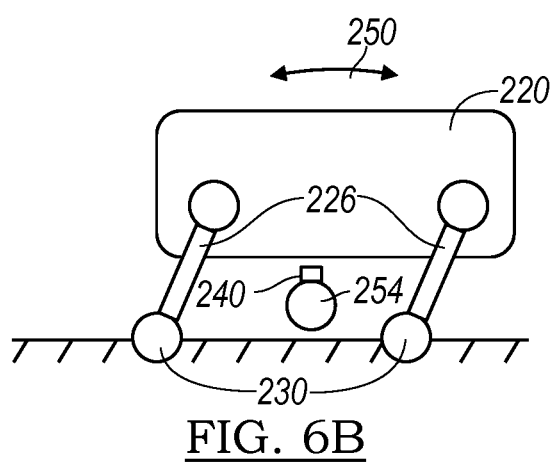
FIG. 6B is a front view of the mass of the vibration absorber system in FIG. 6A.

Referring to both of FIGS. 6A-6B, as the lever 254 pivots about the fulcrum 260 the contacting member 240 no longer exerts the force F2 on the mass 220. The mass 220 may travel about a path 250 created by the pivoting of the connecting members 226 about the first end portions 230, as the mass 220 is no longer constrained in the predetermined position P2.

Figure 7:
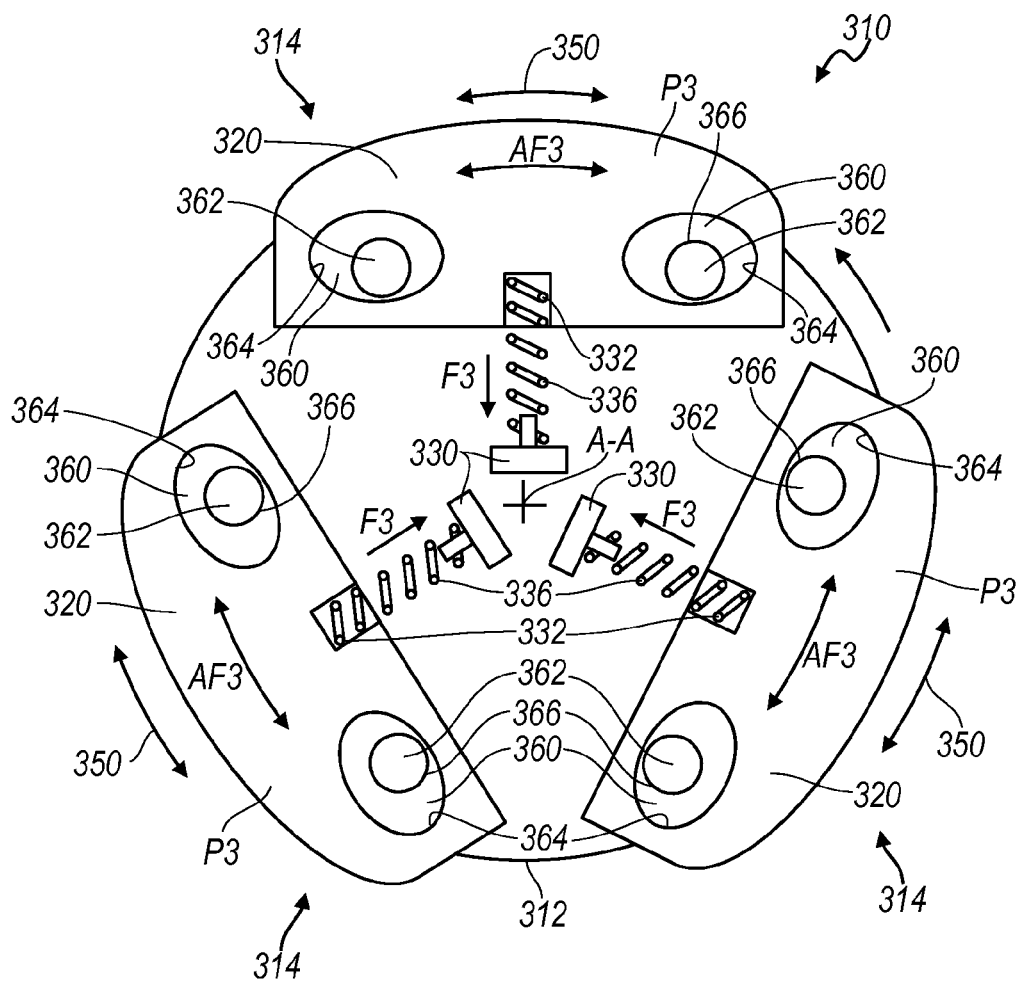
FIG. 7 is an illustration of a vibration absorber system in accordance with an embodiment of the present invention.

Although the vibration absorbers 10, 110, and 210 illustrate the masses as block shaped pendulum masses connected to the shaft by a connecting member, other types of masses and connecting mechanisms may be used as well. For example, referring to FIG. 7 a vibration absorber according to an embodiment of the present invention is illustrated as reference number 310. The vibration absorber 310 includes a shaft 312 and at least one vibration absorber 314. Each mass 320 includes at least one aperture 360 located within the mass 320. A corresponding post 362 connected to the shaft 312 may be provided for each aperture 360, where each aperture 360 receives at least one of the posts 362. A portion of an inner surface 364 of each aperture 360 may contact a portion of an outer surface 366 of the post 362.

A positioning mechanism 336 orients the mass 320 in a predetermined position P3 when the shaft 312 operates below the predetermined rotary speed. In the embodiment as illustrated, the positioning mechanism is a coil spring including a first end portion 330 and a second end portion 332. The first end portion 330 connects to the shaft 312 and the second end portion 232 connects to one of the masses 320. Unlike the vibration absorber systems 10, 110 and 210 discussed above, the positioning mechanism 336 remains connected to the mass 320 as the shaft 312 operates above the predetermined rotary speed.

The positioning mechanism 336 exerts a force F3 that counteracts an acceleration force AF3. The acceleration force AF3 is a force that the mass 320 experiences either as the shaft 312 accelerates above the predetermined rotary speed, or by torque fluctuations created as the shaft 12 operates above the predetermined rotary speed. The acceleration force AF3 allows the mass 320 to travel about the path 350, in a side-to-side motion.

In the embodiment as illustrated, the force F3 is exerted inwardly towards the rotational axis A-A. The force F3 orients each mass 320 in the predetermined position P3 such that each mass 320 is constrained in movement to the predetermined position P3 when the shaft 312 operates below the predetermined rotary speed. When in the predetermined position P3, the acceleration force AF3 created by the corresponding mass 320 does not overcome the force F3 exerted by the positioning mechanism 336. Thus, each mass 320 remains oriented in the predetermined position P3.

As the shaft 312 operates above the predetermined rotary speed, the acceleration force AF3 experienced by each mass 320 overcomes the force F3 from the positioning mechanism 336. Each mass 320 is urged out of the predetermined position P3 and is able to move along the path 350, where each mass 320 may travel about the corresponding post 362. Specifically, as the mass 320 travels about the corresponding post 362, a portion of the outer surface 366 of the post 362 slides about a portion of the inner surface 364 of the aperture 360.

Figure 8A:
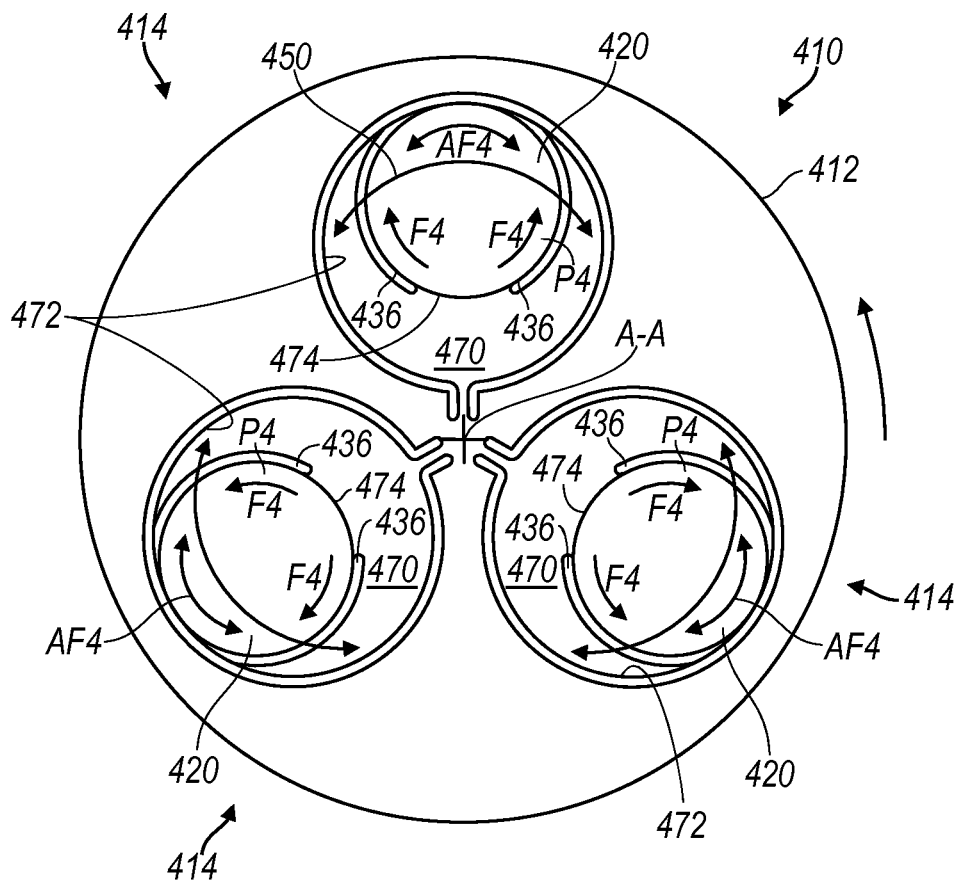
FIG. 8A is an illustration of a vibration absorber system in accordance with another embodiment of the present invention.

In yet another embodiment of a vibration absorber system 410 as illustrated in FIG. 8A, the vibration absorber system 410 includes a shaft 412 and three vibration absorbers 414. In the embodiment as shown, the vibration absorber 414 includes a mass 420 that is substantially roller shaped. The shaft 412 includes a plurality of recesses 470 within the shaft 412, where each recess 470 receives a corresponding mass 420. The recess 470 includes an acurate inner surface 472, where the roller shaped mass 420 travels within the recess 470 and may roll about the acurate inner surface 472.

Figure 8B:
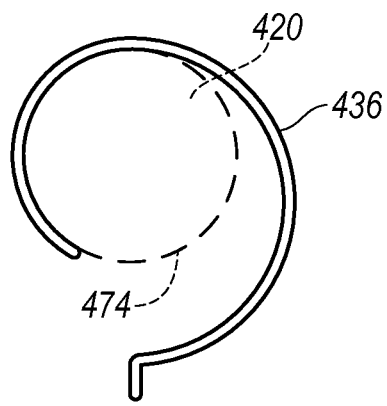
FIG. 8B is an illustration of a pendulum mass and a positioning mechanism illustrated in FIG. 8A.

A positioning mechanism 436 orients the mass 420 in a predetermined position P4. In the embodiment as illustrated in each of FIGS. 8A-8B, the positioning mechanism 436 includes a plurality of coiled reed springs. FIG. 8A illustrates two coiled reed springs wrapped around a portion of the inner surface 472 of the recess 470 and a portion of an outer surface 474 of the mass 420, thereby connecting the mass 420 to the shaft 412. FIG. 8B is a detailed illustrated of the mass 420 and a single coiled reed spring wrapped about a portion of the outer surface 474 of the mass 420. Turning back to FIG. 8A, each of the coiled reed springs are biased and exert a force F4 around a portion of the outer surface 474 of the mass 420. The coiled reed springs orient the corresponding mass 420 in a predetermined position P4 when the shaft 420 operates below the predetermined rotary speed.

As the shaft 412 operates above the predetermined rotary speed, an acceleration force AF4 experienced by the mass 420 overcomes the force F4 from the positioning mechanism 436. Each mass 420 is urged out of the predetermined position P4 and travels along a path 450 within the recess 470. The path 450 may be defined at least in part by the acurate shape of the inner surface 472, where the mass 420 can roll about the acurate inner surface 472 of the recess 470. At least a portion of the positioning mechanism 436 remains wrapped around the outer surface 474 of the mass 420 as the shaft 412 operates above the predetermined rotary speed.

Figure 9:
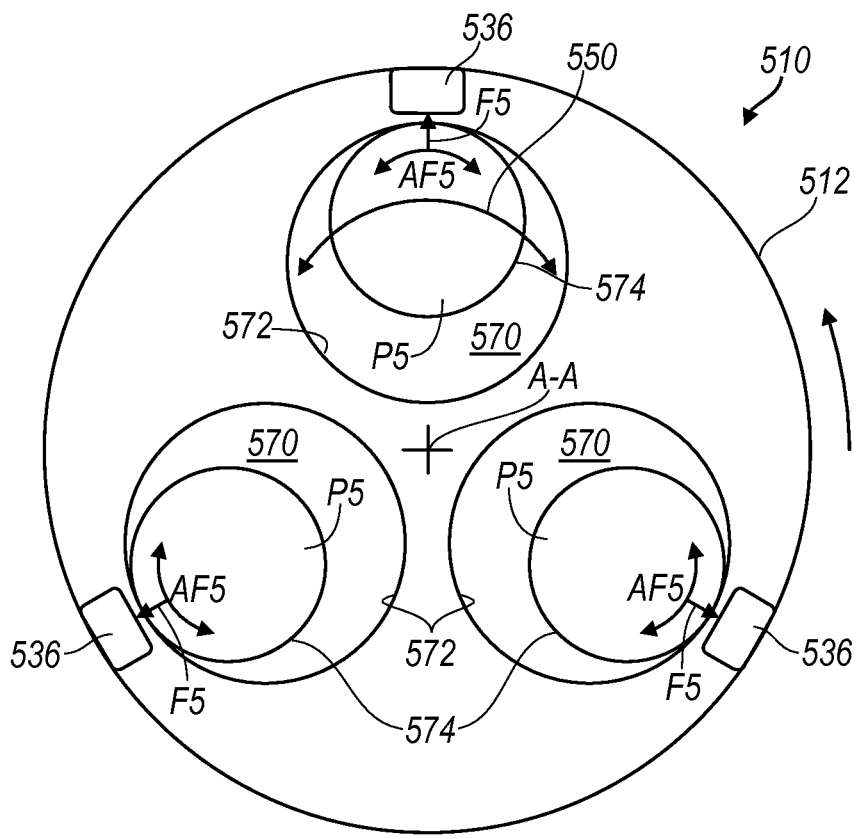
FIG. 9 is an illustration of a vibration absorber system in accordance with yet another embodiment of the present invention.

In the embodiment as shown in FIG. 8A the positioning mechanism 436 is a coiled reed spring, however those skilled in the art will appreciate that other types of mechanisms may be used to position the masses 420 as well. For example, in the embodiment as illustrated in FIG. 9, a vibration absorber system 510 includes a positioning mechanism 536 that is a permanent magnet. The magnet exerts a magnetic force F5 to position a mass 520 in a predetermined position P5 as the shaft 512 operates below the predetermined rotary speed. In the embodiment as illustrated, the mass 520 is constructed from a magnetic material such that the mass 520 is attracted towards the positioning mechanism 536 in a direction outwardly away from the rotational axis A-A. A portion of an inner surface 572 of a recess 570 and a portion of an outer surface 574 of the mass 520 contact one another. As the shaft 512 accelerates above the predetermined rotary speed, the acceleration force AF5 experienced by the mass 520 overcomes the force F5, and the mass 520 is free to travel in a path 550. In the embodiment as illustrated, the mass 520 may roll about the acurate inner surface 572 of the recess 570 while traveling along the path 550.

Figure 10:
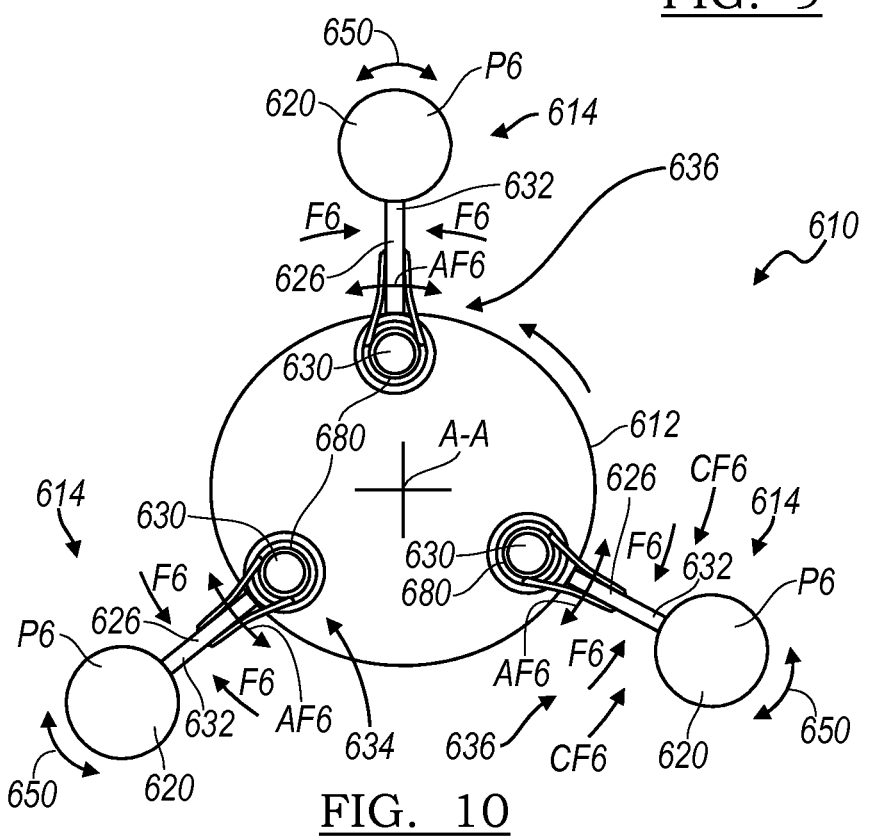
FIG. 10 is an illustration of a vibration absorber system in accordance with an embodiment of the present invention.

Referring to FIG. 10 a vibration absorber according to an embodiment of the present invention is illustrated as reference number 610. The vibration absorber 610 includes a shaft 612 and three vibration absorbers 614. The vibration absorbers 614 each include a mass 620 that travels about a path of movement 650 as the shaft 612 operates above the predetermined rotary speed. In the embodiment as illustrated, each mass 620 is a substantially spherical member.

A positioning mechanism 636 orients the corresponding mass 620 in a predetermined position P6. In the embodiment as shown the mass 620 is connected to the shaft 612 by a connecting member 626, where each connecting member 626 includes a first end portion 630 and a second end portion 632. The connecting members 626 may be connected to the shaft 612 at the first end portion 630 and connected to the mass 620 at the second end portion 632. The connecting members 626 remain substantially stationary when the shaft 612 operates below the predetermined rotary speed, and selectively pivot about the first end portion 630 when the shaft 612 operates above the predetermined rotary speed.

In the embodiment as illustrated, the positioning mechanism 636 is a torsion spring. The torsion spring is wrapped around a pivot point 680 located at the first end portion 630 of the connecting member 626. The positioning mechanism 636 exerts a torsional force F6 at the pivot point 680 such that the connecting member 626 remains in the predetermined position P6, securing the mass 620 in the predetermined position P6. As the shaft 612 accelerates above the predetermined rotary speed, an acceleration force AF6 experienced by the mass 620 overcomes the torsional force F6 from the positioning mechanism 636, allowing the mass 620 travel along the path 650.

Figure 11:
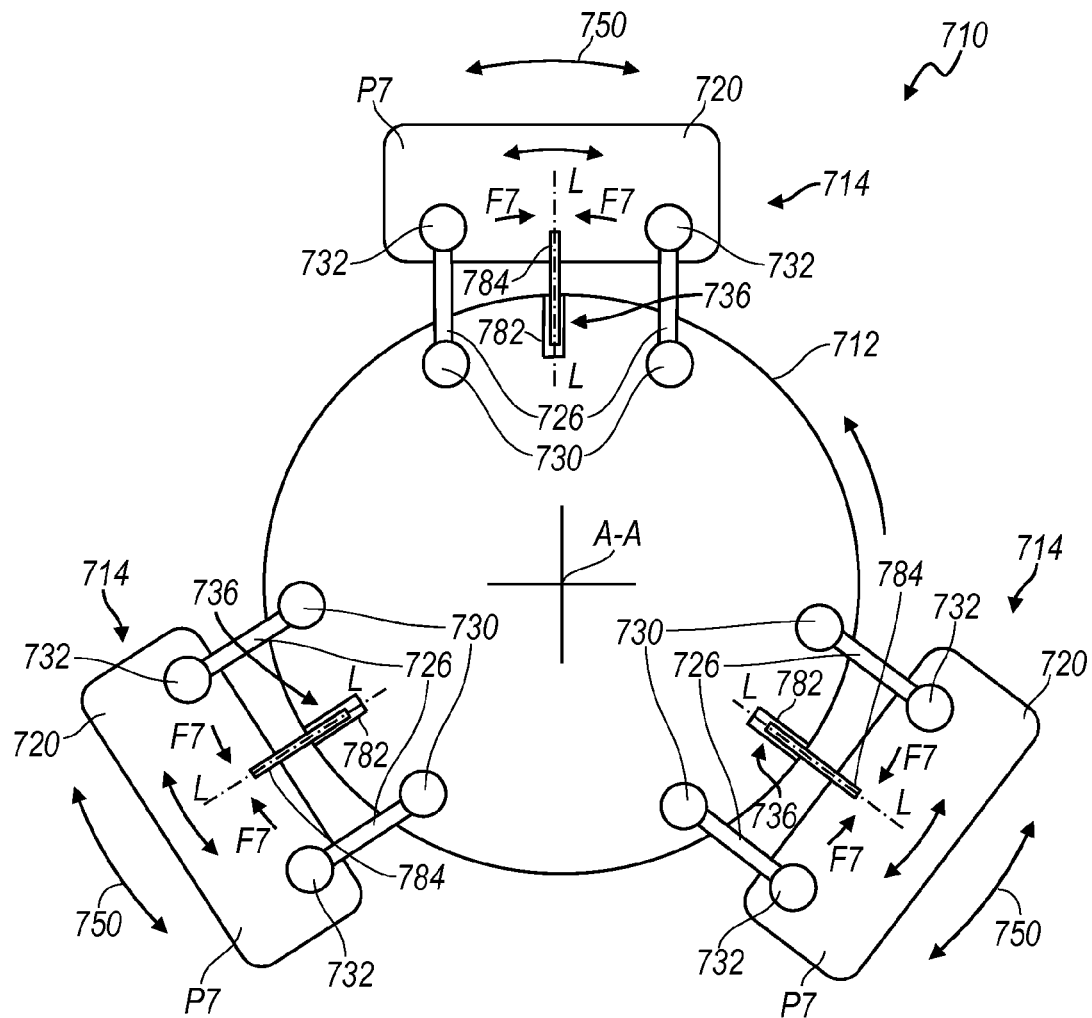
FIG. 11 is an illustration of a vibration absorber system in accordance with another embodiment of the present invention.

In yet another embodiment of a vibration absorber system 710 as illustrated in FIG. 11, the vibration absorber system 710 includes a shaft 712 and three vibration absorbers 714. Each vibration absorber 714 includes a mass 720 that is connected to the shaft 712. In the embodiment as shown, the mass 720 is connected to the shaft 712 by a plurality of connecting members 726, where each of the connecting members 726 include a first end portion 730 and a second end portion 732. The connecting members 726 may be connected to the shaft 712 at the first end portion 730 and connected to the mass 720 at the second end portion 732. The connecting members 726 may be selectively pivoted about the first end portion 730 when the shaft 712 operates above the predetermined rotary speed, and the corresponding mass 720 travels about a path 750 relative to the rotational axis A-A of the shaft 712.

A positioning mechanism 736 orients the masses 720 in a predetermined position P7. The positioning mechanism 736 includes a first end portion 782 and a second end portion 784, where the first end portion 782 connects to the shaft 712 and the second end portion 784 connects to one of the masses 720. In the embodiment as illustrated, the positioning mechanism 736 is a reed spring. The reed spring is biased along an axis L-L, and exerts a force F7 towards the axis L-L to counteract an acceleration force AF7 experienced by the mass 720. Specifically, when the shaft 712 operates below the predetermined rotary speed, the force F7 from the positioning mechanism 736 overcomes the acceleration force AF7 experienced by the mass 720, and the mass 720 is oriented in the predetermined position P7. As the shaft 712 accelerates above the predetermined rotary speed, the acceleration force AF7 experienced by the mass 720 overcomes the force F7 exerted from the positioning mechanism 736, and the corresponding mass 720 may travel along the path 750.

The description of the invention is merely exemplary in nature and variations that do not depart from the gist of the invention are intended to be within the scope of the invention. Such variations are not to be regarded as a departure from the spirit and scope of the invention.

What is claimed is:

1. A system for absorbing vibration in a rotary member having a predetermined rotary speed, the system comprising:
   a pendulum assembly having a mass and a connecting member, wherein the mass has a predetermined position, the connecting member has a first and a second end, the first end pivotally supports the mass, and the rotary member pivotally supports the second end;
   a positioning mechanism having a mass and a biasing member, wherein the biasing member has a first and a second end, the first end is fixed to the mass of the positioning mechanism, the second end is fixed to the outer periphery of the rotating member, and the positioning mechanism exerts a force on the mass of the pendulum assembly at least when the rotary member operates below the predetermined rotary speed, and
   wherein the force exerted by the positioning mechanism orients the mass at the predetermined position when the rotary member operates below the predetermined rotary speed.

2. The system of claim 1 further including a second pendulum assembly having a second selectively moveable mass having a second predetermined position, wherein the predetermined position and the second predetermined position are about equal when measured from a rotary axis of the rotary member.

3. The system of claim 1 wherein the mass of the pendulum assembly experiences an acceleration force as the rotary member accelerates above the predetermined rotary speed, and wherein the acceleration force urges the mass of the pendulum assembly out of the predetermined position.

4. The system of claim 1 wherein the force exerted from the positioning mechanism is removed from the mass of the pendulum assembly when the rotary member operates above the predetermined rotary speed.

5. The system of claim 1 wherein the mass of the positioning mechanism experiences a centrifugal force that compresses the biasing member as the rotary member operates above the predetermined rotary speed.

6. The system of claim 5 wherein the biasing member is a spring, and wherein the mass of the positioning mechanism contacts the mass of the pendulum assembly and exerts the force when the rotary member operates below the predetermined rotary speed.

7. A system for absorbing vibration, comprising:
a rotary member having a predetermined rotary speed;
at least two pendulum assemblies each having a mass and a connecting member, wherein the mass has a predetermined position, the connecting member has a first and a second end, the first end pivotally supports the mass, and the rotary member pivotally supports the second end; member; and
a positioning mechanism corresponding to each mass, wherein the positioning mechanism includes a mass and a biasing member, wherein the biasing member has a first and a second end, the first end is fixed to the mass of the positioning mechanism, the second end is fixed to the outer periphery of the rotating member, and the positioning mechanism exerts a force on the corresponding mass of the pendulum assembly at least when the rotary member operates below the predetermined rotary speed, and
wherein the force exerted by each positioning mechanism orients the mass of the pendulum assembly at the predetermined position when the rotary member operates below the predetermined rotary speed;
wherein the predetermined position for each mass of the pendulum assemblies is about equal to one another when the rotary member operates below the predetermined rotary speed.

8. The system of claim 7 wherein each mass of the positioning mechanism experiences a centrifugal force that compresses the biasing member as the rotary member operates above the predetermined rotary speed.

9. The system of claim 8 wherein the biasing member is a spring, and wherein the mass of the positioning mechanism contacts the mass of the pendulum assembly and exerts the force when the rotary member operates below the predetermined rotary speed.

10. A system for absorbing vibration, comprising:
a rotary member having a predetermined rotary speed;
a pendulum assembly having a selectively movable mass and a connecting member, wherein the mass has a predetermined position, the connecting member has a first and a second end, the first end pivotally supports the mass, and the rotary member pivotally supports the second end;
a positioning mechanism including a positioning mass, the positioning mechanism exerting a force on the selectively movable mass when the rotary member operates below the predetermined rotary speed and does not exert the force on the selectively movable mass when the rotary member operates above the predetermined rotary speed, and wherein the positioning mass experiences a centrifugal force as the rotary member operates above the predetermined rotary speed, and
wherein the force exerted by the positioning mechanism orients the selectively movable mass at the predetermined position when the rotary member operates below the predetermined rotary speed;
wherein the positioning mechanism does not contact the selectively movable mass when the rotating member operates above the predetermined rotary speed.

11. The system of claim 10 wherein the positioning mechanism includes a biasing mechanism that is a spring, wherein the centrifugal force experienced by the positioning mass compresses the biasing mechanism as the rotary member operates above the predetermined rotary speed.

\* \* \* \* \*